United States Patent [19]

Dorenbosch et al.

[11] Patent Number: 5,752,166
[45] Date of Patent: May 12, 1998

[54] METHOD AND APPARATUS FOR CONTROLLING HOW A RECEIVER RESPONDS TO A MESSAGE

[75] Inventors: Jheroen Dorenbosch, Paradise, Tex.; Douglas Irvin Ayerst, Delray Beach, Fla.; Gregory Lewis Cannon, Keller, Tex.

[73] Assignee: Motorola, Inc., Schaumburg, Ill.

[21] Appl. No.: 707,571

[22] Filed: Sep. 4, 1996

[51] Int. Cl.$^6$ .................................................. H04B 17/00
[52] U.S. Cl. ........................ 455/67.1; 455/69; 455/226.1
[58] Field of Search .................................. 455/38.1, 38.2, 455/38.4, 507, 517, 67.1, 68, 69, 70, 226.1, 226.2, 226.3; 340/825.44

[56] References Cited

U.S. PATENT DOCUMENTS

4,868,795 9/1989 McDavid et al. ...................... 455/69
4,875,038 10/1989 Siwiak et al. .
5,278,992 1/1994 Su et al. ................................ 455/69

*Primary Examiner*—Reinhard J. Eisenzopf
*Assistant Examiner*—Thanh Le
*Attorney, Agent, or Firm*—R. Louis Breeden

[57] ABSTRACT

A method and apparatus transmit (502) from a controller (112) a message element (416) and an indication (418) of a signal quality threshold corresponding to the message element. A receiver (122) receives (504) the message element and the corresponding indication of the signal quality threshold, and measures (506) a received signal quality experienced while receiving the message element. The receiver completes (512, 514) a negative response to the message when the received signal quality is worse than the signal quality threshold, and a positive response to the message when the received signal quality is not worse than the signal quality threshold. The message element is defined as one of (a) the message in its entirety and (b) a portion of the message.

19 Claims, 4 Drawing Sheets

METHOD AND APPARATUS FOR CONTROLLING HOW A RECEIVER RESPONDS TO A MESSAGE

RELATED APPLICATION

Application No. 08/496,563 filed Jun. 29, 1995 by Keba et al., entitled "Method and Apparatus for Selectively Encoding Digital Messages in a Communication System."

1. Field of the Invention

This invention relates in general to radio communication systems, and more specifically to a method and apparatus for controlling how a receiver responds to a message.

2. Background of the Invention

In modern messaging systems, messages are generally sent accompanied by additional information that allows error detection and error correction. Normally, when a message contains un-recoverable errors, the message is rejected. In a two-way system, retransmission can be requested, e.g., by sending a negative acknowledgment (NAK).

Certain kinds of messages can be tolerant to small error rates. Examples are image messages and voice messages. Such messages, or portions of the messages, could be accepted by a receiver, provided that the error rate is less than a predetermined threshold. By accepting messages that have sufficiently small error rates instead of requiring retransmission of every message that contains any errors, substantial airtime can be saved. Unfortunately, prior art messaging systems have not provided sufficient capability to adjust error thresholds in order to increase transmission efficiency.

Thus, what is needed is a method and apparatus that provides sufficient adjustment of error thresholds based upon message type and message content. Ideally, the error threshold for each portion of a message should be controllable for maximum airtime efficiency.

SUMMARY OF THE INVENTION

An aspect of the present invention is a method for controlling how a receiver responds to a message received in a radio communication system. The method comprises in a controller of the radio communication system the step of transmitting a message element and an indication of a signal quality threshold corresponding to the message element. The method further comprises in the receiver the steps of receiving the message element and the indication of the signal quality threshold corresponding thereto, and measuring a received signal quality experienced while receiving the message element. The method further comprises in the receiver the step of completing a negative response to the message when the received signal quality is worse than the signal quality threshold, and a positive response to the message when the received signal quality is not worse than the signal quality threshold. The message element is defined as one of (a) the message in its entirety and (b) a portion of the message.

Another aspect of the present invention is a receiver having a controlled response to a message received in a radio communication system. The receiver comprises a receiver circuit for receiving a message element and an indication of a signal quality threshold corresponding to the message element, and a processing system coupled to the receiver circuit for measuring a received signal quality experienced while receiving the message element. The processing system is programmed to complete a negative response to the message when the received signal quality is worse than the signal quality threshold, and to complete a positive response to the message when the received signal quality is not worse than the signal quality threshold. The message element is defined as one of (a) the message in its entirety and (b) a portion of the message.

Another aspect of the present invention is a controller for controlling how a receiver responds to a message received in a radio communication system. The controller comprises a network interface for receiving the message from a message originator, and a processing system coupled to the network interface for processing the message. The controller further comprises a transmitter interface coupled to the processing system for controlling a transmitter to transmit a message element and an indication of a signal quality threshold corresponding to the message element. The message element is defined as one of (a) the message in its entirety and (b) a portion of the message.

DESCRIPTION OF THE PREFERRED EMBODIMENTS

Figure 1:
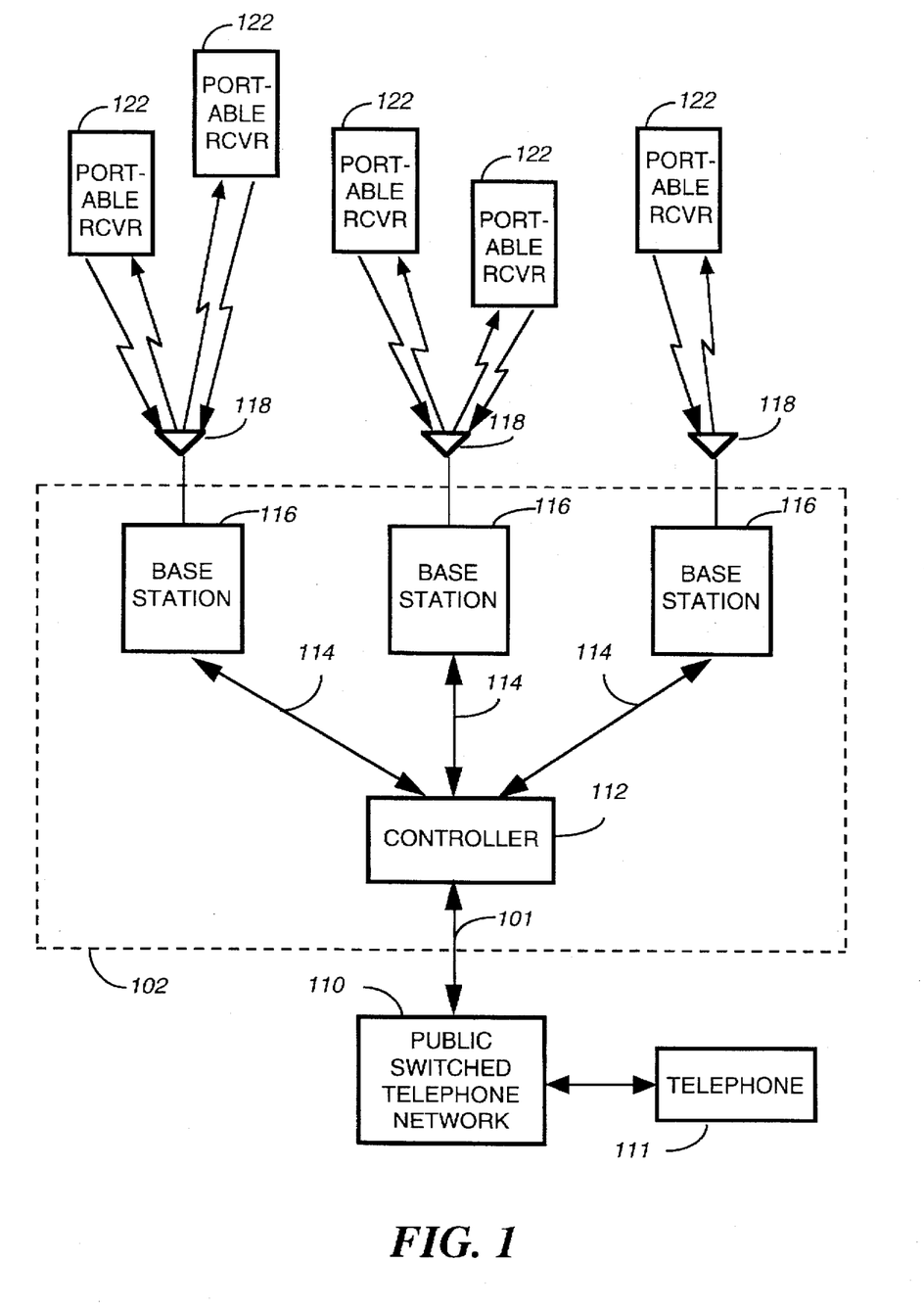
FIG. 1 is an electrical block diagram of a radio communication system in accordance with the present invention.

Referring to FIG. 1, an electrical block diagram of a radio communication system in accordance with the present invention comprises a fixed portion 102 including a controller 112 and a plurality of base stations 116, and a portable portion including a plurality of portable receivers 122, preferably having acknowledge-back capability. The base stations 116 are used for communicating with the portable receivers 122 utilizing conventional radio frequency (RF) techniques, and are coupled by communication links 114 to the controller 112, which controls the base stations 116. The hardware of the controller 112 is preferably a combination of the Wireless Messaging Gateway (WMG™) Administrator! paging terminal, and the RF-Conductor® message distributor manufactured by Motorola, Inc. The hardware of the base stations 116 is preferably a combination of the Nucleus® Orchestra! transmitter and RF-Audience™ receivers manufactured by Motorola, Inc. It will be appreciated that other similar hardware can be utilized as well for the controller 112 and the base stations 116.

Each of the base stations 116 transmits RF signals to the portable receivers 122 via a transceiver antenna 118. The base stations 116 each receive RF signals from the plurality of portable receivers 122 via the transceiver antenna 118. The RF signals transmitted by the base stations 116 to the portable receivers 122 (outbound messages) comprise selective call addresses identifying the portable receivers 122, and data or voice messages originated by a caller. The RF signals transmitted by transmitters in the portable receivers 122 to the base stations 116 (inbound messages) comprise responses that include positive acknowledgments (ACKs), negative acknowledgments (NAKs), and unscheduled messages. An embodiment of an acknowledge-back messaging system is described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably similar to Motorola's well-known FLEXTM family of digital selective call signaling protocols. These protocols utilize well-known error detection and error correction techniques and are therefore tolerant to bit errors occurring during transmission, provided that the bit errors are not too numerous in any one code word. It will be appreciated that other suitable two-way protocols, e.g., the well-known POCSAG protocol, can be used as well. It will be further appreciated that, alternatively, a one-way radio communication system can be utilized, with some limitations, in accordance with the present invention.

Figure 2:
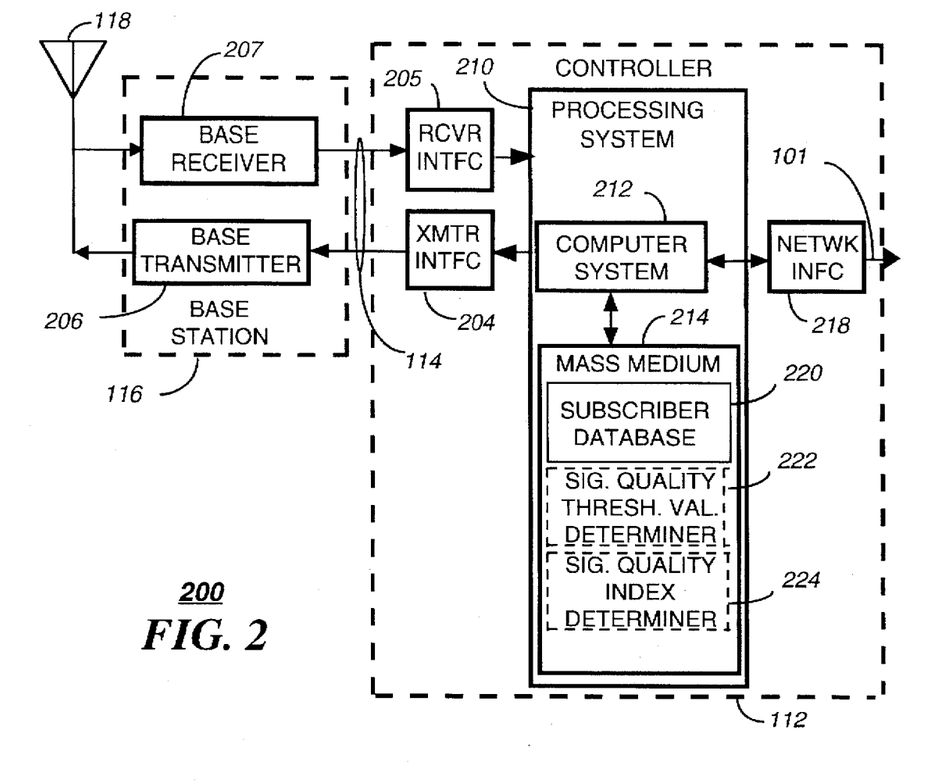
FIG. 2 is an electrical block diagram of portions of a controller and base station in accordance with the present invention.

FIG. 2 is an electrical block diagram 200 of portions of the controller .112 and the base station 116 in accordance with the present invention. The controller 112 includes a processing system 210, a transmitter interface 204, a receiver interface 205, and a network interface 218. The base station 116 includes a base transmitter 206 and, preferably, at least one base receiver 207.

The processing system 210 is used for directing operations of the controller 112. The processing system 210 preferably is coupled through the transmitter interface 204 to the base transmitter 206 via the communication link 114. The processing system 210 preferably also is coupled through the receiver interface 205 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The mass storage medium 214 is programmed to include, for example, a subscriber database 220, comprising subscriber user information such as addressing and programming options of the portable receivers 122. In a first embodiment, the mass storage medium 214 is further programmed to include a signal quality threshold value determiner 222, which the processing system 210 accesses to determine a signal quality threshold value to be transmitted to the portable receivers 122 along with each message or message portion. In a second embodiment, the mass storage medium 214 is further programmed to include a signal quality index determiner 224, which the processing system 210 accesses to determine a signal quality index to be transmitted to the portable receivers 122 along with each message or message portion. The portable receivers 122 then use the signal quality index to determine from a signal quality threshold table 332 (FIG. 3) at least one signal quality threshold value corresponding to at least one message or message portion.

The conventional computer system 212 is preferably programmed by way of the above described software and other software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable receivers 122, and protocol processing of messages destined for the portable receivers 122. The mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207.

Figure 3:
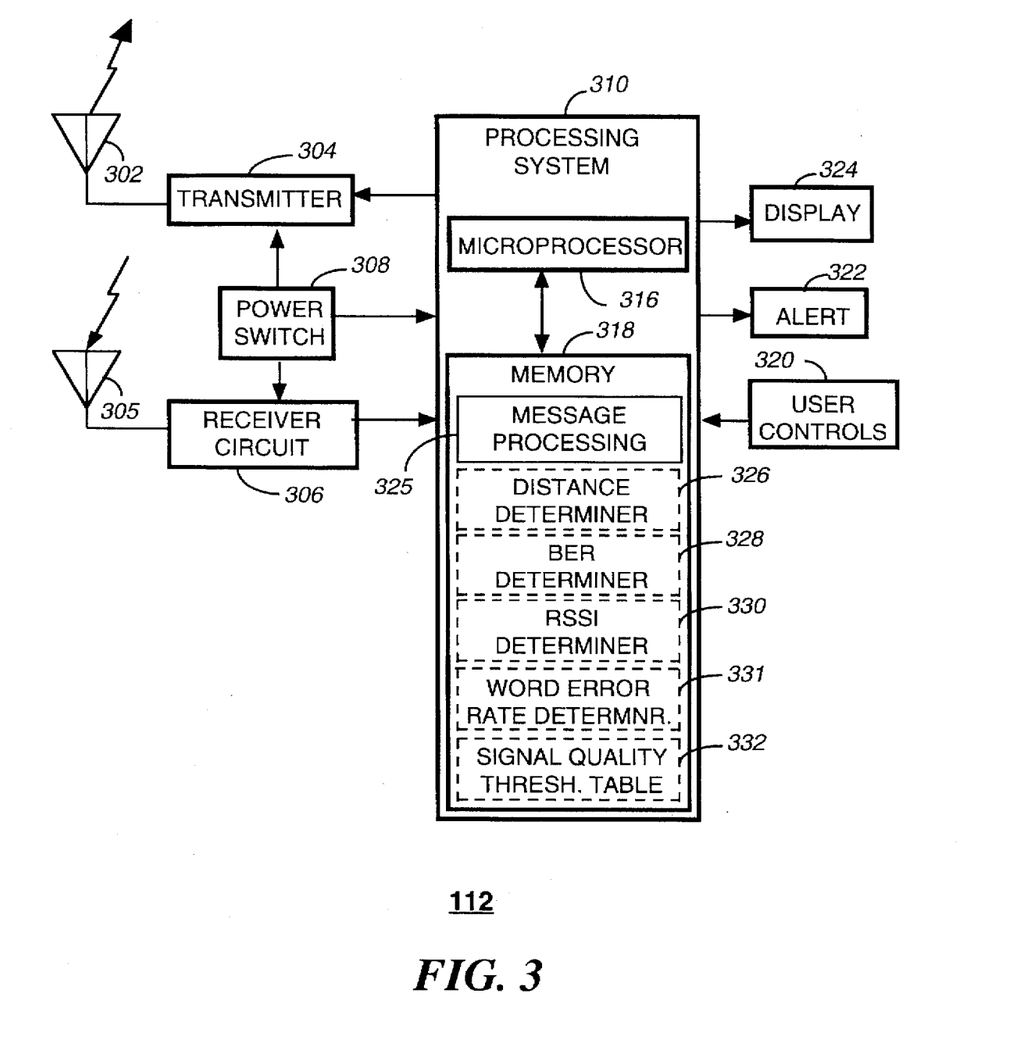
FIG. 3 is an electrical block diagram of a receiver in accordance with the present invention.

FIG. 3 is an electrical block diagram of the portable receiver 122 in accordance with the present invention. The portable receiver 122 comprises a transmitter antenna 302 for transmitting radio frequency (RF) signals to the base stations 116, and a receiver antenna 305 for intercepting RF signals from the base stations 116. The transmitter antenna 302 is coupled to a conventional RF transmitter 304. Similarly, the receiver antenna 305 is coupled to a conventional RF receiver circuit 306. It will be appreciated that, alternatively, the receiver circuit 306 and transmitter 304 can be coupled to a single transceiver antenna, which transmits and intercepts RF signals to and from the base stations 116.

Radio signals received by the RF receiver circuit 306 produce demodulated information at the output. The demodulated information is coupled to the input of a processing system 310 for directing operations of the portable receiver 122, and for processing outbound messages. Similarly, inbound messages are processed by the processing system 310 and delivered to the RF transmitter 304 for transmission to the base stations 116. A conventional power switch 308, coupled to the processing system 310, controls the supply of power to the RF transmitter 304 and RF receiver circuit 306, thereby providing a battery saving function.

To perform the necessary functions of the portable receiver 122, the processing system 310 includes a microprocessor 316, and a memory 318. The microprocessor 316 is, for example, embodied by the M68HC08 microcontroller manufactured by Motorola, Inc. The memory 318 preferably includes a conventional read-only memory (ROM) and a conventional random-access memory (RAM).

The microprocessor 316 is programmed by way of a message processing element 325 in the memory 318 to process a received outbound message element, wherein the message element is defined to be either an entire message or a portion of a message, depending upon the message type and length. In addition, the processing system creates and formats inbound responses, such as positive and negative acknowledgments, to the message. During outbound message processing, the processing system 310 samples the demodulated signal generated by the RF receiver circuit 306. The processing system 310 then decodes an address in the demodulated data of the outbound message, compares the decoded address with one or more addresses stored in the memory 318, and when a match is detected, continues to process the message and to compute a received signal quality during reception of the message element. The processing system 310 also determines a signal quality threshold from an indication thereof received along with the message in accordance with the present invention, as described further below. The received signal quality preferably is determined by a conventional distance determiner 326, which determines the received signal quality from a measurement of distances from ideal symbol values during a conversion of an analog received signal to a digital received signal. Alternatively, the received signal quality can be determined by a conventional bit error rate determiner 328, a conventional received signal strength indication (RSSI) determiner 330, or a conventional word error rate determiner 331. These methods of determining received signal quality are discussed further below.

When a single message element includes the entire message, the processing system 310 completes a negative response (NAK) to the message when the received signal quality during reception the message element is worse than the signal quality threshold, and completes a positive response (ACK) to the message when the received signal quality during reception of the message element is not worse than the signal quality threshold. If the response to the message is positive, the microprocessor 310 then stores the message in the memory 318, and generates a call alerting signal to alert a user that a message has been received. The call alerting signal is directed to a conventional audible or tactile alerting device 322 for generating an audible or tactile call alerting signal. On the other hand, if the response to the message is negative, then the microprocessor 316 waits for the fixed portion 102 to resend the message. When the message comprises a plurality of message elements, the positive response or the negative response preferably is completed based upon a plurality of received signal qualities during reception of the plurality of message elements. For example, when any of the message elements of the message is received below the signal quality threshold corresponding to the message element, then the negative response is completed; otherwise, the positive response is completed. It will be appreciated that, alternatively, an ACK or a NAK can be returned for each individual message element.

By the use of appropriate functions provided by the user controls 320, the outbound message is recovered from the memory 318, and displayed on a display 324, e.g., a conventional liquid crystal display (LCD). Alternatively, when the message is a voice message, the message is played out on a conventional audio circuit (not shown in FIG. 3) that is included in the portable receiver 122. Preferably, the portable receiver 122 utilizes hardware similar to that of the Tenor™ and Tango™ personal messaging units manufactured by Motorola, Inc. of Schaumburg Ill. It will be appreciated that other similar components can be utilized as well for the portable receiver 122.

Figure 4:
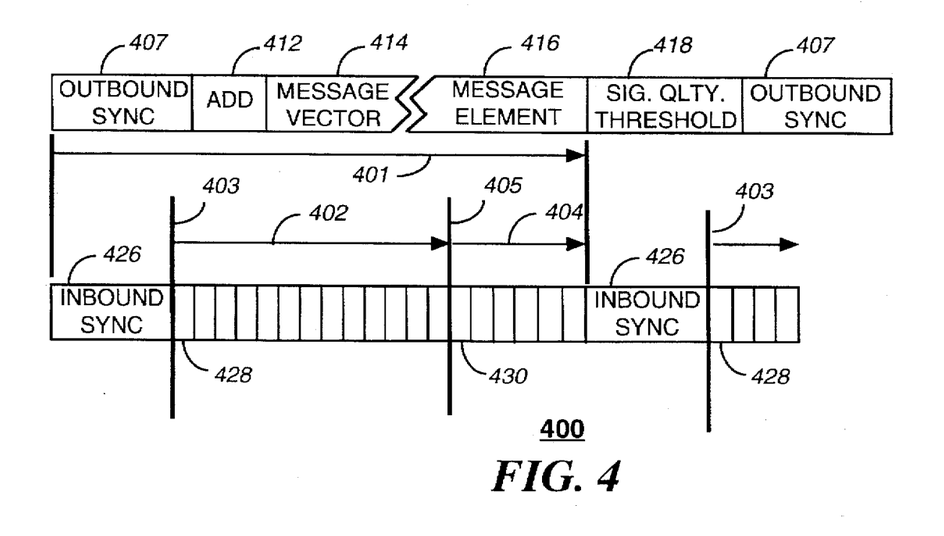
FIG. 4 is a timing diagram of elements of an outbound protocol and an inbound protocol of the fixed and portable portions of the radio communication system in accordance with the present invention.

FIG. 4 is a timing diagram 400 of elements of an outbound protocol and an inbound protocol of the fixed portion 102 and the portable receivers 122 of the radio communication system in accordance with the preferred embodiment of the present invention. The signaling format operating on the outbound and inbound channels preferably operates on independent frequencies utilizing frequency division multiplexing (FDM). Using FDM transmission, both outbound and inbound RF channel transmissions are depicted during a time interval 401.

The elements of the outbound protocol comprise an outbound sync 407, a selective call address 412, a message vector 414, an outbound message element 416, and a corresponding indication 418 of a signal quality threshold. The outbound sync 407 provides a means for synchronization utilizing techniques well known in the art. The selective call address 412 identifies the portable receiver 122 for which the outbound message element 416 is intended. The message vector 414 points in time within the signal format to the position of the outbound message element 416 to be received by the portable receiver 122. The message vector 414 further provides information to the portable receiver 122 identifying a scheduled time slot for acknowledging the message transaction. In accordance with the present invention, the signal quality threshold indication 418 informs the receiver 122 as to what level of signal quality is deemed to be acceptable for the message element 416. The portable receiver 122 will respond negatively when the message element 416 is received with a signal quality that is worse than the signal quality threshold, and positively when the message element 416 is received with a signal quality that is not worse than the signal quality threshold, as explained more fully herein below.

The elements of the inbound protocol comprise an inbound sync 426, scheduled time slots 428, and unscheduled time slots 430. The inbound sync 426 provides the base stations 116 a means for synchronization utilizing techniques well known in the art. Scheduled messages, e.g., positive and negative acknowledgments, commence after the inbound sync 426 at a time boundary 403. A transmission time interval 402 depicts the time interval for scheduled transmissions on scheduled time slots 428 from the portable receivers 122. Unscheduled messages, e.g., spontaneous requests, commence after a time boundary 405 which depicts the end of scheduled transmissions from the portable receivers 122. The duration of unscheduled transmissions on unscheduled time slots 430 is depicted by a transmission time interval 404.

Unscheduled time slots 430 may be used by any portable receiver 122. For certain cases there may be more portable receivers 122 attempting to utilize unscheduled time slots 430 than available. To overcome this limitation, the well-known ALOHA protocol is utilized for unscheduled messages.

Figure 5:
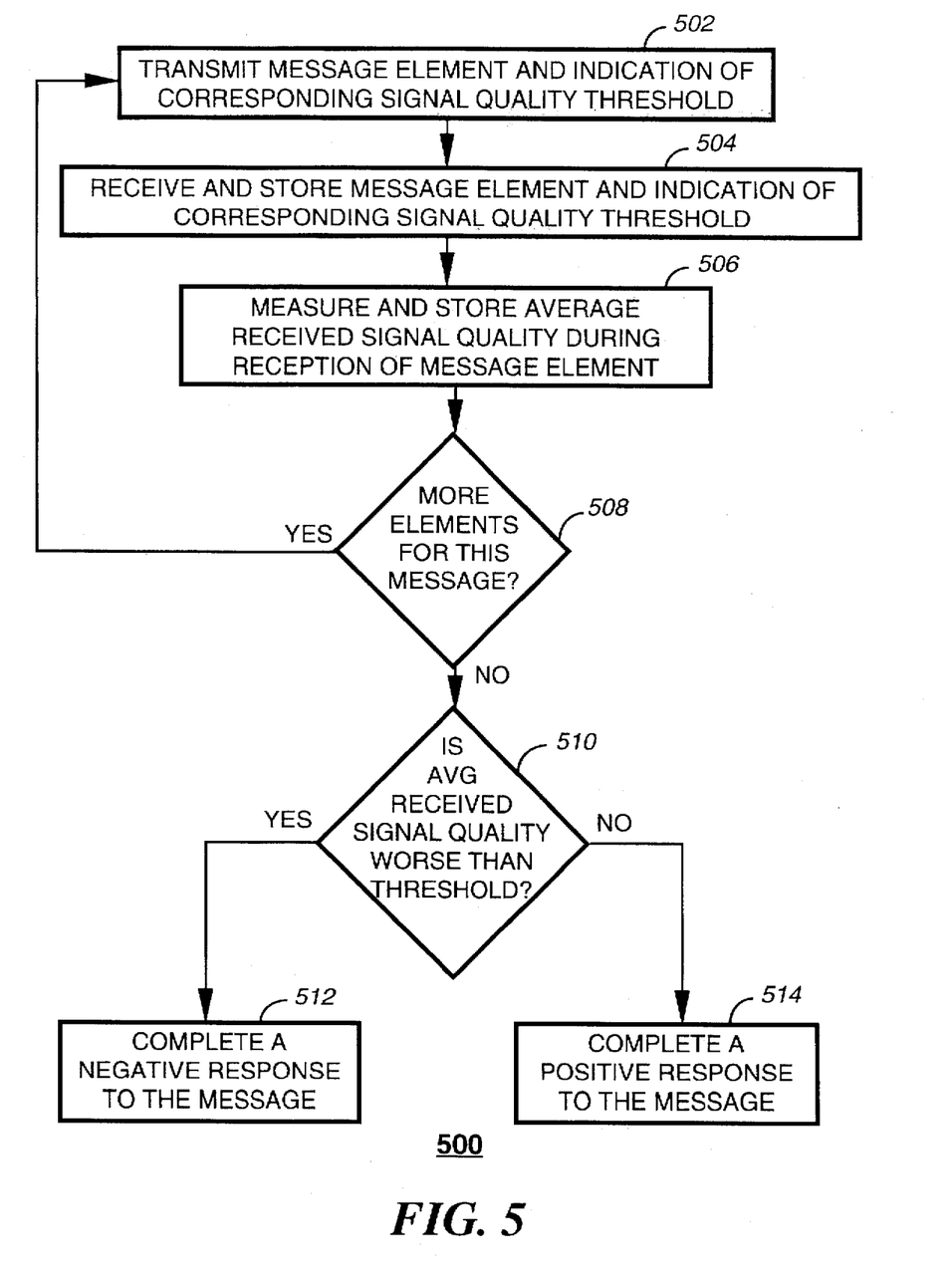
FIG. 5 is a flow chart depicting operation of the radio communication system in accordance with the present invention.

FIG. 5 is a flow chart 500 depicting operation of the radio communication system in accordance with the present invention. The flow begins with the controller 112 controlling 502 one of the base stations 116 to transmit the message element 416 and the indication 418 of a signal quality threshold corresponding to the message element 416. The indication 418 is preferably a value representing the actual signal quality threshold. The processing system 310 of the portable receiver 122 then receives and stores 504 the message element 416 and the indication 418 of the signal quality threshold in the memory 318. During the reception of the message element 416 the processing system 310 measures and stores 506 a received signal quality experienced. How the processing system 310 measures the received signal quality will be described in detail further below.

Then the processing system 310 determines 508, e.g., from additional information sent in the message vector 414, whether the current message comprises additional message elements 416. If so, steps 502 through 508 are repeated until the entire message is received. When there are no more message elements 416 to be received for the current message, the processing system 310 checks 510 whether the received signal quality determined for the message is worse than the signal quality threshold. When the message comprises only a single message element 416, the processing system 310 preferably compares the signal quality threshold with the received signal quality measured during reception of the message element 416 to make the determination. When the message comprises a plurality of message elements 416, the processing system 310 preferably compares the signal quality threshold assigned to each of the plurality of message elements 416 with the received signal quality measured during reception of each of the plurality of message elements 416. Then if the received signal quality measured for any of the plurality of message elements 416 of the message is worse than the corresponding signal quality threshold, the processing system 310 completes 512 a negative response to the message. Otherwise, the processing system 310 completes 514 a positive response to the message.

Preferably, the radio communication system is a two-way messaging system. For such a system the positive response comprises transmitting a positive acknowledgment (ACK), and the negative response comprises transmitting a negative acknowledgment (NAK). By adjusting the signal quality threshold in accordance with the criticality of the message element, the present invention eliminates unnecessary NAKs resulting from uncritical message elements, thereby advantageously reducing airtime required for message retransmissions.

Alternatively, the present invention can be applied to a one-way messaging system. Preferably, for such a system the positive response comprises presenting the message to a user of the portable receiver 122, and the negative response comprises ignoring the message. While this form of operation does not reduce airtime directly, it reduces airtime indirectly by reducing the number of manually resent messages required. This is accomplished by allowing messages having uncritical errors to be presented to the user rather than being ignored or blocked. Thus, the user can confirm to the caller that the message was received.

Preferably, the processing system 310 measures the received signal quality during reception of the message element by measuring the distance of each received bit from ideal symbol values during conversion of the analog received signal to a digital received signal, utilizing well-known techniques. For example, assume a four-level modulation in which first, second, third, and fourth digital values correspond to ideal analog symbol values of 1, 2, 3, and 4 volts, respectively. An example received signal of 2.8 volts is converted to the third digital value (corresponding to 3 volts), and the distance of the received symbol value from the ideal symbol value is 0.2 volts. The sum of the distances from the closest ideal symbol value taken across all the symbols of the message element 416, divided by the number of symbols in the message element 416, is a measurement of distances representing the received signal quality. For this preferred embodiment, the signal quality threshold is a distance threshold, and the negative response occurs when the measurement of distances from the ideal symbol values is greater than the distance threshold, and the positive response occurs when the measurement of distances from ideal symbol values is not greater than the distance threshold.

Alternatively, the processing system 310 can determine the received signal quality from a received signal strength indication (RSSI), utilizing well-known techniques. One such technique is to digitally compute a moving average of in-band received power during reception of the message element 416. When practicing this alternative, the signal quality threshold is an RSSI threshold, and the negative response occurs when the RSSI is less than the RSSI threshold, and the positive response occurs when the RSSI is not less than the RSSI threshold.

Another alternative is for the processing system 310 to determine the received signal quality from a received bit error rate (BER), utilizing well-known techniques. One such technique is to periodically send a known bit pattern and count bit errors in the received signal. When practicing this alternative, the signal quality threshold is a bit error rate threshold, and the negative response occurs when the received bit error rate is greater than the bit error rate threshold, and the positive response occurs when the received bit error rate is not greater than the bit error rate threshold.

Another alternative is for the processing system 310 to determine an estimate of the received signal quality from a received word error rate (WER), utilizing well-known techniques. The WER is determined by utilizing the forward error correction built into the communication protocol. After error correction the processing system 310 can easily detect how many code words of the message have too many bit errors for the error correction to correct. Dividing the number of uncorrectable words by the total number of words in the message provides the WER for the message. When practicing this alternative, the signal quality threshold is a WER threshold, and the negative response occurs when the received WER is greater than the WER threshold, and the positive response occurs when the received WER is not greater than the WER threshold.

In yet another alternative embodiment, the indication 418 of the signal quality threshold is an index for selecting an entry in the signal quality threshold table 332 of the portable receiver 122. In this embodiment, the processing system 310 uses the index to access the table entry in the signal quality threshold table 332 and to determine from the entry at least one signal quality threshold corresponding to at least one portion of the message. More specifically, for messages comprising a plurality of message elements 416, the index can be sent only once per message (e.g., along with the first message element 416) to identify a plurality of signal quality thresholds corresponding to the plurality of message elements 416, or specific message portions defined by the index. This technique advantageously further reduces the airtime required.

By way of example, the preceding description has discussed the application of the present invention in the outbound transmission direction of a two-way radio communication system. It will be appreciated that, alternatively, the present invention can be applied to the inbound transmission direction as well. More specifically, with appropriate modifications the transmitter 304 of the portable receiver 122 can transmit the message element and the corresponding signal quality threshold, and the base receiver 207 can measure and compare the received signal quality with the signal quality threshold. Thus, either or both transmission directions of a two-way radio communication system can enjoy the benefit of improved airtime efficiency provided by the present invention.

Thus, it should be apparent by now that the present invention provides a method and apparatus that allows sufficient adjustment of error thresholds based upon message type and message content. Advantageously, the error threshold for each portion of a message is controllable for maximizing airtime efficiency.

What is claimed is:

1. A method for controlling how a receiver responds to a message received in a radio communication system, the method comprising in a controller of the radio communication system the step of:

transmitting a message element and an indication of a signal quality threshold corresponding to the message element; and the method further comprising in the receiver the steps of:

receiving the message element and the indication of the signal quality threshold corresponding thereto;

measuring a received signal quality experienced while receiving the message element; and completing a negative response to the message when the received signal quality is worse than the signal quality threshold, and a positive response to the message when the received signal quality is not worse than the signal quality threshold, wherein the message element is defined as one of (a) the message in its entirety and (b) a portion of the message.

2. The method of claim 1, wherein the measuring step comprises the step of determining the received signal quality from a received bit error rate, and wherein the signal quality threshold is a bit error rate threshold, and wherein in the completing step the negative response occurs when the received bit error rate is greater than the bit error rate threshold, and the positive response occurs when the received bit error rate is not greater than the bit error rate threshold.

3. The method of claim 1, wherein the measuring step comprises the step of determining the received signal quality from a received signal strength indication (RSSI), and wherein the signal quality threshold is an RSSI threshold, and wherein in the completing step the negative response occurs when the RSSI is less than the RSSI threshold, and the positive response occurs when the RSSI is not less than the RSSI threshold.

4. The method of claim 1, wherein the measuring step comprises the step of determining the received signal quality from a measurement of distances from ideal symbol values during a conversion of an analog received signal to a digital received signal, and wherein the signal quality threshold is a distance threshold, and wherein in the completing step the negative response occurs when the measurement of distances from ideal symbol values is greater than the distance threshold, and the positive response occurs when the measurement of distances from ideal symbol values is not greater than the distance threshold.

5. The method of claim 1, wherein the measuring step comprises the step of determining the received signal quality from a measurement of word error rate (WER), and wherein the signal quality threshold is a WER threshold, and wherein in the completing step the negative response occurs when the WER is greater than the WER threshold, and the positive response occurs when the WER is not greater than the WER threshold.

6. The method of claim 1, wherein the transmitting step comprises the step of transmitting a value that represents the signal quality threshold.

7. The method of claim 1, wherein the transmitting step comprises the step of transmitting an index for selecting an entry in a table in the receiver, and wherein the receiving step comprises the step of utilizing the index to access the entry in the table and to determine therefrom at least one signal quality threshold corresponding to at least one portion of the message.

8. The method of claim 1, wherein the transmitting and receiving steps occur in at least one of an outbound transmission direction and an inbound transmission direction.

9. The method of claim 1, wherein the radio communication system is a two-way messaging system, and wherein in the completing step the positive response comprises the step of transmitting a positive acknowledgment (ACK), while the negative response comprises the step of transmitting a negative acknowledgment (NAK).

10. The method of claim 1, wherein the radio communication system is a one-way messaging system, and wherein in the completing step the positive response comprises the step of presenting the message to a user of the receiver, while the negative response comprises the step of ignoring the message.

11. A receiver having a controlled response to a message received in a radio communication system, the receiver comprising:

a receiver circuit for receiving a message element and an indication of a signal quality threshold corresponding to the message element; and a processing system coupled to the receiver circuit for measuring a received signal quality experienced while receiving the message element, wherein the processing system is programmed to complete a negative response to the message when the received signal quality is worse than the signal quality threshold, and to complete a positive response to the message when the received signal quality is not worse than the signal quality threshold, and wherein the message element is defined as one of (a) the message in its entirety and (b) a portion of the message.

12. The receiver of claim 11, wherein the processing system comprises a bit error rate determiner for determining the received signal quality from a received bit error rate, and wherein the signal quality threshold is a bit error rate threshold, and wherein the processing system is further programmed to complete the negative response when the received bit error rate is greater than the bit error rate threshold, and to complete the positive response when the received bit error rate is not greater than the bit error rate threshold.

13. The receiver of claim 11, wherein the processing system comprises a received signal strength indication (RSSI) determiner for determining the received signal quality, and wherein the signal quality threshold is an RSSI threshold, and wherein the processing system is further programmed to complete the negative response when the RSSI is less than the RSSI threshold, and to complete the positive response when the RSSI is not less than the RSSI threshold.

14. The receiver of claim 11, wherein the processing system comprises a distance determiner for determining the received signal quality from a measurement of distances from ideal symbol values during a conversion of an analog received signal to a digital received signal, and wherein the signal quality threshold is a distance threshold, and wherein the processing system is further programmed to complete the negative response when the measurement of distances from ideal symbol values is greater than the distance threshold, and to complete the positive response when the measurement of distances from ideal symbol values is not greater than the distance threshold.

15. The receiver of claim 11, wherein the processing system comprises a word error rate (WER) determiner for determining the received signal quality from a measurement of the WER, and wherein the signal quality threshold is a WER threshold, and wherein in the processing system is further programmed to complete the negative response when the WER is greater than the WER threshold, and to complete the positive response when the WER is not greater than the WER threshold.

16. The receiver of claim 11, wherein the radio communication system is a two-way messaging system, and wherein the processing system is further programmed to transmit a positive acknowledgment (ACK) as the positive response, and to transmit a negative acknowledgment (NAK) as the negative response.

17. The receiver of claim 11, wherein the radio communication system is a one-way messaging system, and wherein the processing system is further programmed to present the message to a user of the receiver as the positive response, and to ignore the message as the negative response.

18. The receiver of claim 11, further comprising a memory element including a table of signal quality thresholds, wherein the indication of the signal quality threshold is an index into the table, and wherein the processing system is further programmed to utilize the index to access an entry in the table and to determine therefrom at least one signal quality threshold corresponding to at least one portion of the message.

19. A controller for controlling how a receiver responds to a message received in a radio communication system, the controller comprising:

a network interface for receiving the message from a message originator;

a processing system coupled to the network interface for processing the message, wherein the processing system is programmed to transmit an index utilized by the receiver for selecting an entry in a table in the receiver to determine therefrom at least one signal quality threshold corresponding to at least one portion of the message; and a transmitter interface coupled to the processing system for controlling a transmitter to transmit a message element and an indication of a signal quality threshold corresponding to the message element, wherein the message element is defined as one of (a) the message in its entirety and (b) a portion of the message.

* * * * *